Patented Feb. 12, 1924.

1,483,567

UNITED STATES PATENT OFFICE.

KOJI ANJOW, OF TOKYO-FU, JAPAN, ASSIGNOR TO MITSUBISHI KOGYO KABUSHIKI KAISHA, OF TOKYO, JAPAN, A CORPORATION OF JAPAN.

PROCESS OF PRODUCING TUNGSTEN OXIDE FROM TUNGSTEN ORES.

No Drawing.   Application filed April 26, 1923. Serial No. 634,924.

*To all whom it may concern:*

Be it known that I, KOJI ANJOW, a subject of the Empire of Japan, residing at No. 1281 Minami-shinagawa-juku, Shinagawa-machi, Ebara-gun, Tokyo-fu, Japan, have invented new and useful Improvements in Processes of Producing Tungsten Oxide from Tungsten Ores, of which the following is a specification.

This invention relates to a process of producing tungsten oxides from tungsten ores and involves the use of dilute sulphuric acid with or without pressure in a closed vessel.

The object of my invention is to carry out the process of making metal, alloys, hydroxide, oxide or any other compounds of tungsten in commercially pure state from tungsten ores in the most economical way without any technical difficulty unavoidable in the process hitherto known.

The use of sulphuric acid for the decomposition of tungsten ores is generally known but its operation has hitherto been done by the use of more or less concentrated sulphuric acid in an open vessel. The process is uneconomical, troublesome and even dangerous, as is described and criticized fully in the following.

As is well known, tungsten ores are very stable and are not acted upon by sulphuric acid at temperatures below 100° centigrade. At temperatures considerably higher than 100° centigrade, the decomposition sets in. Its decomposition, therefore, has hitherto been done by the use of concentrated sulphuric acid or a mixture of this acid and other salts in order to raise the temperature of the system sufficiently high to complete the reaction. These old processes not only consumed great amount of chemicals and fuels, therefore, exceedingly uneconomical, but also are accompanied by two unavoidable technical difficulties. One of the difficulties is that the reaction products are difficultly soluble in the concentrated sulphuric acid, and therefore, the reaction stops as soon as the particles of the ores are covered by the films of the decomposition products. This gives rise to incomplete decomposition, troublesome operation for separating the reaction products from undecomposed ores and waste of materials and labour. The other difficulty in carrying out the old processes lies in the fact that the charged materials are under the condition prevailing apt to settle in the bottom of the vessel and form a hard crust and makes the mixing of the ore and solvent extremely difficult or even impossible. Air or steam has been blown into the concentrated acid for the purpose of mixing the reaction system but this proved to be the most insufficient way for mixing the heavy thick fluid, moreover, troublesome in operation owing to the evolution of suffocating fume containing sulphur oxides and even dangerous owing to the spitting of hot concentrated sulphuric acid.

I have now discovered that dilute sulphuric acid is the most powerful decomposition agent and that the tungsten ores are easily acted upon by it giving rise to the hydrated oxide of tungsten, without any technical difficulty or trouble during the operation.

In carrying out my invention, I take tungsten ores in a state of fine powder, charge them in a closed vessel with sufficient amount of dilute sulphuric acid and continue stirring while heating. As the decomposition is carried out in a closed vessel, any temperature can be applied without difficulty and danger of suffocating gas and spitting acid. The reaction products do not form insoluble films upon ores, therefore, the reaction proceeds speedily and completely to the end. The stirring of the reaction system, moreover, can be done most easily and most effectively and there is no marked tendency that the ore particles settle down at the bottom of the vessel during the stirring.

Another useful feature of my invention lies in the fact that common impurities such as iron and manganese go easily and completely into the solution during the reaction and therefore by simple washing they are easily and completely excluded from tungsten oxides. This is not the case in the old processes, as the reaction products of these impurities are difficultly soluble in the concentrated sulphuric acid forming hard solid films upon ores and even by repeated washing it is difficult to remove the last trace of these impurities. Other impurities such as tin, silicon and calcium may also be easily excluded by further treatment with ammonia or caustic alkali solution according to the known method.

In the following I give a few examples which will show how the process can be carried out. I do not wish, however, to limit myself to these examples, as it is easy to attain the same object by changing one or more parts of the examples.

*Example 1.*

Prepare fine powder of wolframite, as fine as 1/50 millimeter or even finer. Four parts of 10% (by volume) sulphuric acid and one part of the powdered ore are charged in an autoclave, which is provided with a stirrer and acid proof lining. While stirring it is heated by steam or direct firing to 180° centigrade under pressure, by which treatment iron and manganese in the ore are completely converted into soluble sulphates. After half an hour treatment in this way, the mixture is blown out into a settling tank and the clear solution is then decanted off. The solution can be used repeatedly for the treatment of the next charge of the powdered ore. To the settled mass, water is added and while stirring it is removed into a washing tank, in which it is washed repeatedly with water until the washed water becomes almost neutral. The washed material is then filtered and dried and commercially pure (99%) tungstic oxide is thus obtained. One hundred parts of this powdered oxide and fifteen parts of powdered charcoal are thoroughly mixed and placed in an iron crucible. This is reduced at 1200° centigrade and commercial metallic tungsten is thus obtained.

It can be used for the preparation of tungsten alloys.

*Example 2.*

In the same way as example 1, powdered wolframite is treated with the dilute sulphuric acid and the decomposed mass is thoroughly washed and filtered and dried at 150° centigrade.

In order to remove tin, silica or other impurities, if any such is present, the dried hydrated tungsten oxide is dissolved in dilute ammonia water by warming, the solution filtered and evaporated. The crystals of pure ammonium tungstate thus obtained are then roasted. We obtain in this way pure (99.9%) tungsten oxide. When it is reduced by hydrogen gas at 1100° centigrade pure metallic tungsten is obtained which can be used for the preparation of electric lamp filament.

*Example 3.*

Prepare fine powder of sheelite, as fine as 1/200 millimeter or even finer. Three parts of 15% (by volume) sulphuric acid and one part of the powdered ore are charged in an autoclave, which is provided with a stirrer and acid proof lining. While stirring it is heated by steam or direct firing to 150° centigrade under pressure, by which treatment calcium and other impurities are completely converted into sulphates. After one hour treatment in this way, the mixture is blown out in a settling tank, the clear solution is then decanted off. The solution can be repeatedly used for the treatment of the further quantity of the powdered ore. To the settled mass water is added and while stirring it is removed into a washing tank, in which it is washed thoroughly with water until the washed water becomes almost neutral. By this treatment the greater part of the formed calcium sulphate is washed out and tungsten oxide containing a small amount of calcium is obtained. This is dried and mixed with charcoal powder and reduced to metal. If it is desired to remove the calcium completely, the reduced metal is boiled with dilute hydrochloric acid and then it is thoroughly washed with water. By this treatment commercially pure tungsten metal (99.5%) is easily obtained.

In this invention I do not wish to limit myself to the use of pure sulphuric acid, as any mixture of sulphuric acid and other acids or their salts can be used to obtain the same object.

What I claim as my invention and desire to secure by Letters Patent is:—

1. A process for producing hydrated oxides of tungsten, which consists in treating finely powdered tungsten ore with dilute sulphuric acid under pressure in a closed vessel to eliminate impurities contained therein.

2. A process for producing hydrated oxides of tungsten, which consists in treating finely powdered tungsten ore with dilute sulphuric acid in a closed vessel under pressure to eliminate impurities contained therein, obtaining hydrated oxides of tungsten in a form easily soluble in aqueous solution reacting alkaline.

3. A process for producing hydrated oxides of tungsten, which consists in treating finely powdered sheelite with dilute sulphuric acid in a closed vessel under pressure to remove the greater part of the calcium and treating the reduced material of this decomposition product with dilute hydrochloric acid to complete the removal of calcium compounds.

4. A process for producing hydrated oxides of tungsten, which consists in treating finely powdered tungsten ores containing iron, manganese, calcium or any number of them, with dilute sulphuric acid in a closed vessel under pressure to remove any or all of iron, manganese and calcium contained therein.

In testimony whereof I have signed my name to this specification.